United States Patent [19]

Redfield

[11] Patent Number: 4,824,146

[45] Date of Patent: Apr. 25, 1989

[54] FLEXIBLE CONNECTOR TUBE

[75] Inventor: John H. Redfield, Huntington Woods, Mich.

[73] Assignee: The Acme Group, Detroit, Mich.

[21] Appl. No.: 153,078

[22] Filed: Feb. 8, 1988

[51] Int. Cl.⁴ .............................................. F16L 11/12
[52] U.S. Cl. ...................................... 285/45; 285/236; 138/39
[58] Field of Search ..................... 285/260, 236, 45; 138/39; 98/1

[56] References Cited

U.S. PATENT DOCUMENTS 1,861,296  5/1932  Braly ..................................... 285/260
1,948,909  2/1934  Evans ............................... 285/260 X

FOREIGN PATENT DOCUMENTS 1460556  12/1966  France ................................. 285/260

Primary Examiner—Dave W. Arola
Attorney, Agent, or Firm—Harness, Dickey & Pierce

[57] ABSTRACT

A flexible connector for connecting adjacent ends of spaced apart, upper and lower conduits used in conveying particulate material, where one of the conduits regularly moves, is formed of a cloth-like tube whose upper and lower ends surround the conduits and are secured thereto by elasticized bands. A loose, cloth-like, tubular sleeve is arranged within the tube with its upper end secured to the upper end of the tube for surrounding the upper conduit with the tube upper end. The sleeve is otherwise unsecured to the tube and its lower end loosely extends beneath the tube and into the upper end of the lower conduit. A resilient, stiff band surrounds and is secured to the middle of the tube for maintaining the shape of the tube while the sleeve is free to move and yield under the impact of, and the venturi-like effect due to, the flow of particulate material from the upper conduit to the lower conduit through the connector.

13 Claims, 1 Drawing Sheet

FLEXIBLE CONNECTOR TUBE

BACKGROUND OF INVENTION

This invention relates to a cloth-like tubular connector for interconnecting adjacent ends of conduits through which particulate or granular material is flowed.

Particulate or granular material, such as rice, wheat and other grains, plastic pellets, sand and the like, frequently are conveyed through tubular conduits wherein one of the conduits is oscillated or vibrated or otherwise moved relative to the other. For example, the particulate material may be flowed from a storage bin through a tubular conduit and into a conduit or conduit-like opening in a sorting machine which is vibrated or oscillated. For this and other types of connections where a flexible connection is necessary between two adjacent open ends of conduits or conduit-like openings, a tubular flexible connector is commonly used. Typically, such connectors are made of elongated tube of a cloth-like material whose upper and lower ends are arranged to overlap the adjacent edge portions of the conduits and are secured thereto by means of an elastic band. An example of such a type connector is disclosed in U.S. Pat. No. 3,516,694 issued June 23, 1970 to Schwartz.

In the prior connector tubes, such as illustrated in the foregoing prior patent, the upper and lower ends of the cloth-like tube are hemmed to form a channel within which an elastic band is positioned for elastically or resiliently gripping against the respective overlapped conduit portions. In addition, a stiffer, but resilient band, such as one made of a coil spring configuration is arranged around the middle of the tube and is secured thereto for maintaining the shape of the tube.

Because such connectors are typically used in conveying relatively abrasive granular material the cloth wears out rapidly and the tubes must be replaced periodically. Attempts to prolong the lives of these tubes have generally involved using heavier fabrics, laminations of different kinds of fabrics, stiffer fabrics, etc. While these different innovations, such as the use of laminations of different fabrics have substantially prolonged the lives of these tubes, nevertheless, their lives are relatively short.

In addition, many kinds of granular material include fine dust-like particles which tend to work their way through the spaces in the woven cloth-like material utilized for this purpose. In some applications, the dust can be severe enough to require measures for clearing the air around the connector.

Next, particulate material tends to flow in a liquid-like manner through the connector and, consequently, creates a venturi effect. That is, the flow of the fluid-like material causes a reduction the the pressure in the interior of the tube. Thus the tube tends to collapse inwardly to some degree. The amount of inward flexing or collapse varies with different interior pressures that are caused by variation in flow rates, types of materials, etc. The inward flexing of the tube adversely effects the seal between the tube ends and the overlapped conduit ends and also, increases wear.

This invention is concerned with improving a flexible connector tube to reduce the wear, dust, seal and other problems associated with prior connector tubes.

SUMMARY OF INVENTION

This invention contemplates a flexible connector, for interconnecting adjacent, vertically aligned, conduit ends, formed of a cloth-like tube having resilient bands at its upper and lower ends for fastening the tube upon the overlapped conduit end portions, and with a loose, interior sleeve arranged within the tube. The upper end of the sleeve is secured to the upper end of the tube. Otherwise, the sleeve is free of connection to the tube so that it hangs loosely within the tube and extends a distance beneath it into the upper end of the lower conduit. That is, the lower end of the tube surrounds and grips against the outer surface of the upper end portion of the lower conduit while the sleeve loosely drops into the conduit.

The loose sleeve is free to independently flex and yield under the impacts and abrasive contacts with the particulate material flowing through the connector from one conduit to the other. In addition, the tube and the sleeve are free to move or vibrate or oscillate, substantially independently of each other, in response to the repetitive motion of either or both of the conduits. Further, the sleeve is free to independently collapse inwardly and to move outwardly under the changing pressures induced by the venturi-effect of the fluid-like flow of particulate material through the connector.

An object of this invention is to provide a freely movable sleeve within the tubular connector which will substantially increase the life of the connector due to its much greater resistance to wear, to abrasion and to impacts. Another object is to provide a sleeve which resists the leakage of dust outwardly through the connector. The dust which may leak through the sleeve enters into the space between the sleeve and the tube and will periodically drop out or be manually let out of the space at the lower part of the tube. This avoids a build-up of dust. Much of the dust can drop down into the lower conduit around the lower end of the sleeve. Thus, little, if any, dust leaks out through the tube.

A further object of this invention is to provide an inexpensive connector construction, including an inexpensive sleeve arrangement, which can be installed, used and removed with no increase in the time or labor, which can be made at little increased cost, but which will substantially reduce the expense and frequency of replacing worn connectors.

An additional object of this invention is to provide an inexpensive way of increasing the connectors ability to resist higher temperatures and more hostile atmospheres, through the use of a cloth-like interior, liner-like sleeve which can be made of a material that is selected to better resist such elements.

These and other objects and advantages of this invention will become apparent upon reading the following description, of which the attached drawings form a part.

DETAILED DESCRIPTION

Figure 1:
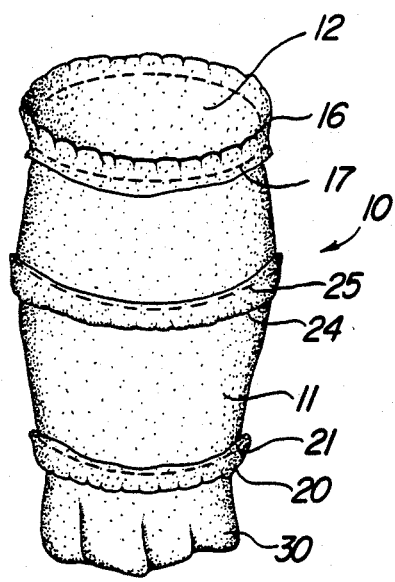
FIG. 1 is a perspective view of the flexible tubular connector of this invention.
Figure 2:
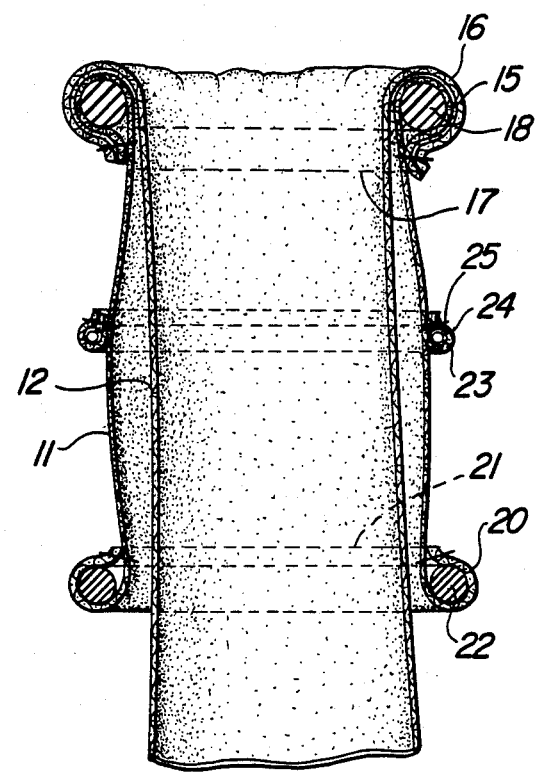
FIG. 2 is an enlarged, cross sectional, elevational view of the connector.

Referring to the drawings, the flexible connector 10 is formed of an outer tube 11 and an inner sleeve 12. The tube and the sleeve are each made of a cloth-like material, such as a woven nylon or other suitable woven or monolithic, synthetic cloth. The particular kind of cloth-like material selected will vary depending upon the requirements of the use of a particular connector. Since such materials are readily available, the selection may be made considering such factors as the amount of flexing anticipated, resistance to abrasion, wear resistance, resistance to relatively high temperatures, resistance to acidic atmospheres or other hostile atmospheres, cost, availability, etc. Available synthetic cloths can be found which will resist acidic atmospheres and temperatures of up to roughly 400 degrees F and can be used, especially for the sleeve where such conditions are encountered by the connector.

The upper edge of the tube is bent outwardly and downwardly to form a folded hem 15. Similarly, the upper edge of the sleeve is bent upwardly and outwardly to form a folded sleeve hem 16 which folds over and overlaps the tube hem. The two hems may be fastened together by sewn stitches 17. An elastic band 18 is arranged within the surrounding hem 15. This band may be formed of so called shock-cord or similar elasticized or resilient rope-like cord which forms an endless resilient band.

The lower end of the tube is also bent around into a folded formed hem 20 which is secured by sewn stitches 21 to the body of the tube. A similar elastic band 22 is arranged within the lower hem 20.

The diameter of the tube and the diameters of its elastic bands are selected so that the upper and lower ends of the tube may closely fit over the conduit ends and resiliently grip and seal against the conduit portions which they overlap.

One or more central stiffener bands 23 are secured around the outside of the tube. These bands are relatively stiff, but sufficiently resilient to flex. A suitable form of band comprises a small diameter, long coil spring whose opposite ends are connected together. As an example, a one-half inch diameter elongated coil spring may be used with a roughly twelve inch diameter tube. The coil spring is arranged within a double bent cloth strip 24 which is fastened by sewn stitches 25 around the exterior of the tube 11.

Figure 3:
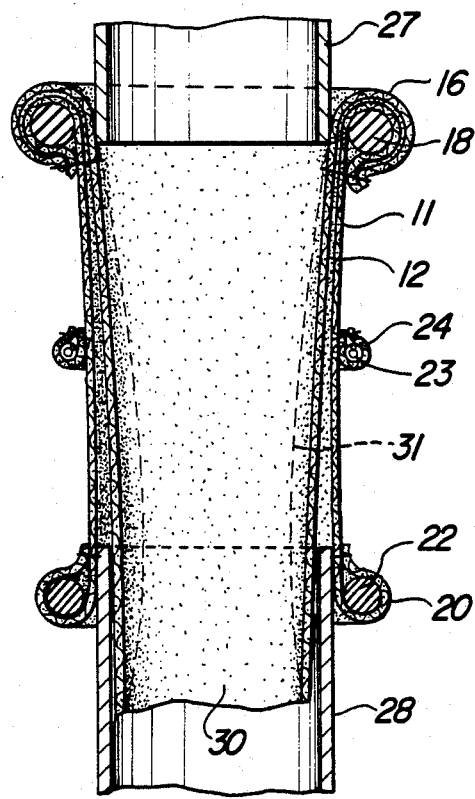
FIG. 3 is an enlarged, cross sectional, elevational view showing the connector applied to interconnect the ends of a pair of conduits.
Figure 4:
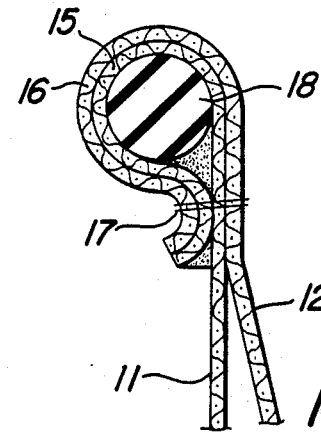
FIG. 4 is a greatly enlarged, fragmentary view, of the upper portion of the tubular connector.
Figure 4:
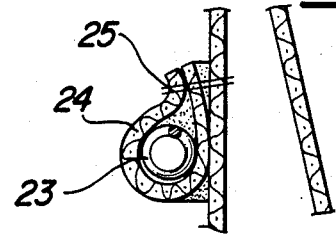

As illustrated diagramatically in FIG. 3, the upper end of the tube, which is enveloped by the upper end of the sleeve, surrounds and is sealed by the upper elastic band 18, against the lower edge portion of an upper conduit 27. The lower edge of the tube is resiliently sealed, by the lower elastic band 22, around the upper portion of a lower conduit 28. Except for its upper edge, the sleeve is free of securement to the tube and to the lower conduit, and hangs loosely between the conduits. The lower end of the sleeve 12 loosely extends a considerable distance beneath the lower end of the tube 11 and into the upper portion of the lower conduit 28.

Since the sleeve is loose from the bottom of the upper conduit down to and inside the lower conduit, it is free to flex, yield, and to contract inwardly, as indicated by the dotted lines 31, in response to the venturi effect which frequently occurs because of the fluid-like movement of particulate material through the sleeve. The inward contraction varies depending upon the nature and volume of the particulate material pouring through the connector at any specific time.

Since the sleeve is flexible and yields under the forces of abrasion and impacts resulting from the moving particles, wear is greatly reduced. Hence, the sleeve can be made of less expensive materials than were previously needed to give prior tubes a reasonably long useful life. Moreover, the sleeve material can be selected to accommodate the particular environment to which it is subjected, e.g., high temperature, acidic, particularly abrasive granular material, etc. Thus, it may be made of a material that is different than the tube material. That permits the manufacturer of this device to change the different type of sleeve materials without changing the tube material for different use requirements.

As previously mentioned, dust or fine particles tend to work their way through prior connectors. In this case, the dust or fine particles that get through the sleeve is trapped within the space within the sleeve and the tube. Thus, such dust tends to fall downwardly either between the space between the sleeve and tube and into the conduit or, alternatively, into the space where the bottom of the tube is sealed to the conduit by the elastic band 22. The dust that is trapped between the bottom of the tube and the conduit can periodically be removed, such as by manually pulling a part of the lower edge of the tube away from the conduit to permit the dust to spill into a suitable container.

The reference to conduits in this description refers to either circular or non-circular, such as square or rectangular or oval shaped, tubes. In addition, in many uses, the connector joins a long tubular conduit to a short flange around an opening in a machine. For example, the feed opening of a vibrating sorting machine may be surrounded by a low, upwardly extending flange. Thus, the term conduit refers to any tube-like element upon which the connector is held. Since either or both of the conduits may be vibrated or oscillated to promote the movement or screening or sorting of the conveyed particles, the tube flexes in response to the conduit movement. As mentioned, the sleeve is free to move a considerable amount independently of the tube. While the sleeve is unrestrained, the resilient stiffener band 23 at the middle of the tube remains the shape of the tube notwithstanding the movement of the sleeve. Where necessary, additional bands 23 may be positioned around the exterior of the tube depending upon the length of the connector and the amount of stiffening needed for a particular use.

This invention may be further developed within the scope of the following claims. Accordingly, it is desired that the foregoing description be read as illustrative of an operative embodiment of this invention and not in a strictly limiting sense.

Having fully described an operative embodiment of this invention, I now claim:

1. A flexible connectorfor connecting together adjacent ends of an upper tubular conduit and a lower tubular conduit, said conduits being substantially in axial alignment one above the other, so that a lower end of said upper conduit is above an upper end of said lower conduit, and wherein one of said conduits is capable of repetitively moving relative to the other, the connector comprising:

a tube formed of a cloth-like material and having an open upper end portion including an upper edge situated uppermost of said upper end portion, said upper end portion sized to fit over and closely surround the lower end of the upper tubular conduit and an open lower end portion sized to fit over and closely surround the upper end of the lower tubular conduit so that each conduit has an overlapped end, each overlapped end having an axial overlap dimension being an amount, measured axially, that the tube covers said conduit;

a pair of encircling band members applied respectively on said upper end portion and lower end portion of the tube for gripping around and fastening the tube portions upon respective overlapped ends;

an interior, tubular, cloth-like sleeve coaxially arranged within the tube and having an upper end including securing means securing said sleeve to the upper end portion of the tube and a lower end extending to the lower end of the tube, said sleeve being otherwise free of securement to the tube, the sleeve being formed to tightly engage the lower end of the upper conduit together with the upper end of the tube and to extend loosely between the conduits down the upper end of the lower conduit, whereby the sleeve is free to independently yield and flex under the impact and contact with particulate material passing through the connector from the upper to the lower conduit.

2. A flexible connector as defined in claim 1, and including the lower end of said sleeve extending a distance beneath the lower end of said tube for extending deeply into the open upper end of the lower conduit, said distance being substantially greater than the axial overlap dimension of the lower conduit.

3. A flexible connector as defined in claim 1, and including the upper end of said sleeve extending over the upper edge of the tube and being bent around the outside of the upper edge of the tube to form a hem which overlaps the upper edge of the tube, and wherein said securing means includes stitching means securing said hem to the tube.

4. A flexible connector as defined in claim 1, and the upper end portion of the tube being bent downwardly to form a hem, and with said band member being in the form of an elastic band arranged within the hem and surrounding the upper end portion of the tube.

5. A flexible connector as defined in claim 4, and including the upper end of said sleeve being bent outwardly and downwardly to form a hem which overlaps the hem of the tube, with the hems surrounding the band member and the hems being fastened together by said securing means, said securing means including stitching means securing said hems to the tube.

6. A flexible connector as defined in claim 5, and including the lower end portion of the tube being bent outwardly and upwardly to form a bent over hem and with its band member being formed of an elastic band arranged within the hem for resiliently gripping the adjacent overlapped conduit portion.

7. A flexible connector as defined in claim 6, and including the lower end of said sleeve extending a substantial distance beneath the lower end of said tube for loosely extending a distance into the lower conduit which is substantially greater than the distance of overlap of the lower end of the tube with the lower conduit.

8. A flexible connector as defined in claim 7, and including at least one elongated, spring-like resilient, but relatively stiff band surrounding the tube between its upper and lower ends, and also including a double bent cloth strip folded around said band and secured to the tube by said securing means, said securing means including stitching means securing lateral edges of said strip to said tube, said cloth strip for securing said band to the tube exterior surface for maintaining the central portion of the tube in predetermined open condition, while the sleeve is independently free to collapse inwardly in response to the venturi-like effect caused by rapid fluid-like movement of particulate material through the sleeve.

9. A flexible connector for connecting together adjacent ends of a pair of spaced apart conduits which are located one above the other, and wherein one of said conduits is capable of repetitively moving relative to the other, comprising:

an elongated tube formed of a cloth-like material having an upper end portion sized to overlap and closely surround the lower end of the upper conduit, and a lower end portion sized to overlap and closely surround the upper end of the lower conduit for interconnecting the two conduits;

means for securing the upper and lower end portions of the tube to their respective overlapped conduit portions;

an interior tubular sleeve formed of a cloth-like material arranged coaxially within the tube, said sleeve having an upper end including an upper edge, said upper end secured to the upper end portion of the tube;

stitching means for securing the upper end of said sleeve to the upper end portion of the tube, said sleeve being otherwise free of securement to the tube and loosely hanging downwardly within the tube for loosely extending into the upper end of the lower conduit, whereby the tube independently yields and flexes under the impacts and contacts from particulate material flowing from the upper conduit, through the connector and into the lower conduit.

10. A flexible connector as defined in claim 9, and including the upper end of the sleeve being bent into a hem which extends over and embraces the upper end portion of the tube and is secured thereto by said stitching means, securing said upper edge of said sleeve to said tube.

11. A flexible connector as defined in claim 10, and including a stiff, but resilient band surrounding the tube between the opposite ends of the tube, and also including a double bent cloth strip folded around said band and stitching securing lateral edges of said strip to said tube, said cloth strip for securing said band to the tube for maintaining the shape of the tube while permitting some resilient flexing thereof.

12. A flexible connector as defined in claim 11, and including the upper edge of the tube being bent into a hem within which said means for sewing includes a resilient band positioned for gripping the adjacent overlapped conduit portion for fastening the tube thereto, and including the upper, hemmed portion of the sleeve overlapping the hemmed portion of the tube with the two hemmed portions secured together.

13. A flexible connector as defined in claim 12, and including the lower edge portion of the tube being bent into a hem within which said means for sewing includes a resilient band positioned for gripping against and thereby securing the lower end of the tube upon the upper edge portion of the conduit.

* * * * *